US008370319B1

(12) United States Patent
Krynski et al.

(10) Patent No.: US 8,370,319 B1
(45) Date of Patent: Feb. 5, 2013

(54) DETERMINING SEARCH QUERY SPECIFICITY

(75) Inventors: Tevye Rachelson Krynski, Oakland, CA (US); Deepak Jain, Fremont, CA (US); Dan Catalin Teodorescu, Shoreline, WA (US)

(73) Assignee: A9.com, Inc., Palo Alto, CA (US)

( * ) Notice: Subject to any disclaimer, the term of this patent is extended or adjusted under 35 U.S.C. 154(b) by 14 days.

(21) Appl. No.: 13/043,370

(22) Filed: Mar. 8, 2011

(51) Int. Cl.
*G06F 7/00* (2006.01)
*G06F 17/30* (2006.01)

(52) U.S. Cl. ........ 707/706; 707/805; 709/218; 709/227; 705/26.12; 705/7.11; 705/14.54

(58) Field of Classification Search .................. 707/706, 707/723, 735, 748, 770, E17.042, E17.043, 707/E17.108, 999.003, 805; 709/218, 227; 705/26.62, 7.11, 14.54
See application file for complete search history.

(56) References Cited

U.S. PATENT DOCUMENTS

| 7,734,722 | B2* | 6/2010 | Seidl et al. | 709/218 |
|---|---|---|---|---|
| 8,065,299 | B2* | 11/2011 | Curtis et al. | 707/727 |
| 8,176,067 | B1* | 5/2012 | Ahmad et al. | 707/765 |
| 8,209,316 | B2* | 6/2012 | Li et al. | 707/706 |
| 2006/0064411 | A1* | 3/2006 | Gross et al. | 707/3 |
| 2006/0085392 | A1* | 4/2006 | Wang et al. | 707/3 |
| 2007/0038614 | A1* | 2/2007 | Guha | 707/4 |
| 2008/0027913 | A1* | 1/2008 | Chang et al. | 707/3 |
| 2008/0114751 | A1* | 5/2008 | Cramer et al. | 707/5 |
| 2009/0119286 | A1* | 5/2009 | Reisman | 707/5 |
| 2009/0259646 | A1* | 10/2009 | Fujita et al. | 707/5 |
| 2010/0094673 | A1* | 4/2010 | Lobo et al. | 705/7 |
| 2010/0114654 | A1* | 5/2010 | Lukose et al. | 705/10 |
| 2010/0169802 | A1* | 7/2010 | Goldstein et al. | 715/760 |
| 2010/0241507 | A1* | 9/2010 | Quinn et al. | 705/14.42 |
| 2012/0102044 | A1* | 4/2012 | Ott et al. | 707/748 |
| 2012/0130814 | A1* | 5/2012 | Hayes | 705/14.54 |

OTHER PUBLICATIONS

Mingfang Wu, Andrew Turpin and Justin Zobel—"An Investigation on a Community's Web Search Variability"—Proc. 31st Australasian Computer Science Conference (ACSC 2008), Wollongong, Australia—vol. 74—pp. 117-126.*
Benjamin Piwowarski, Georges Dupret and Rosie Jones—"Mining User Web Search Activity with Layered Bayesian Networks or How to Capture a Click in its Context"—Proceeding WSDM '09 Proceedings of the Second ACM International Conference on Web Search and Data Mining—pp. 162-171.*

* cited by examiner

*Primary Examiner* — Anh Ly
(74) *Attorney, Agent, or Firm* — Novak Druce Connolly Bove + Quigg LLP

(57) ABSTRACT

Systems and methods described and suggested herein utilize various techniques to assess the degree of specificity of search queries. By assessing the degree of specificity of search queries, the systems and methods may be used to determine where the submitting users' intentions fall along the continuum between specific and general searching. Thus, the systems and methods may be used to, among other uses, deliver search results that more closely coincide with the users' intentions. For example, if data associated with a search query indicates that users typically submit the search query with the intention of specific searching, embodiments may tailor search results to include a limited number of highly relevant search-result items. On the other hand, for example, if data associated with a search query indicates that users typically submit the search query with the intention of general searching, embodiments may tailor search results to include a diverse set of search-result items from multiple categories.

23 Claims, 5 Drawing Sheets

DETERMINING SEARCH QUERY SPECIFICITY

BACKGROUND

Users often use systems, such as enterprise search systems and web search engines, to search content sources to identify items of interest. To perform a search, a user typically selects a search query that describes the item of interest and then submits the search query to a search engine. For example, a user that wants to find information about a particular item and potentially purchase that item from an online retailer may select a search query the user believes describes the item and then submit the selected search query to a search engine provided on the online retailer's website. A query server processes the search query to identify items that may be of interest to the user, and returns search results that include information about the identified items. However, users often select and submit search queries with a variety of intentions and the search results are not always consistent with the users' intentions.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
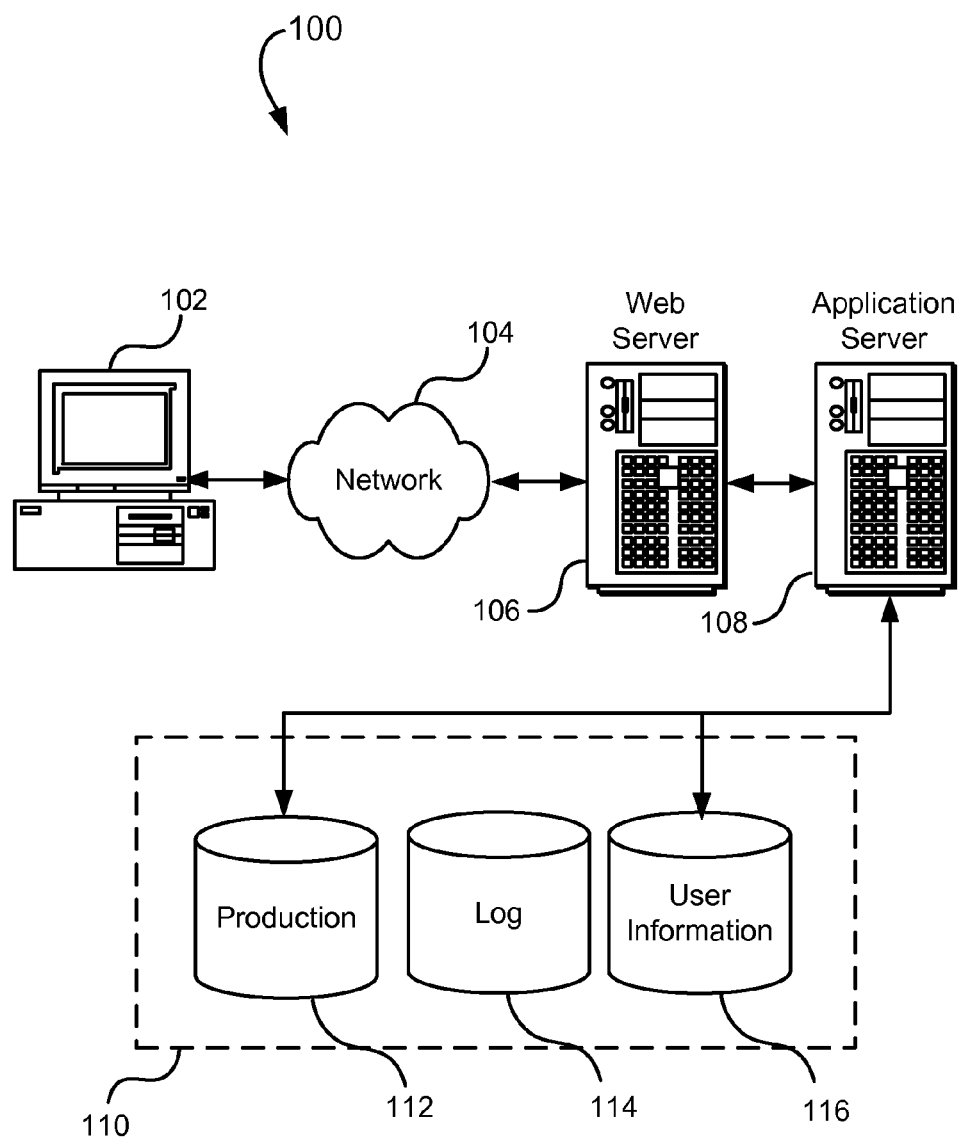
FIG. 1 is a schematic diagram illustrating an environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

In some instances, users select and submit search queries with the intention of obtaining information about particular items for consumption, including, but not limited to, consumer products, services, electronic content, access rights to content, and, generally, any items that may be consumed. For example, a user seeking information about a particular camera may select and submit a search query the user believes describes the particular camera. The selected search query, for example, may correspond to the brand and model of the camera (e.g., "Canon® EOS 7D camera"). For illustrative convenience, this type of searching is referred to herein as "specific" searching. However, it should be appreciated that other terms are commonly used to refer to this type of searching. Such terms include "navigational" searching. When a user's intention is specific searching, the user likely prefers a small number of search results that are limited to information about a particular product. However, when users select and submit search queries with the intention of specific searching, search engines often do not recognize the users' intentions. Accordingly, search engines often return search results that include information about a range of products, even though the user may prefer that the search results be limited to information about a particular product.

In other instances, users select and submit search queries with the intention of obtaining information about a range of products. For example, a user that wants to research different types of products related to a category may select and submit a search query that corresponds to a description of the category, such as "women's clothing" or "toys." Also, for example, a user that wants to research a range of products may select and submit a search query that correspond to a brand name (e.g., Canon®, Adidas®) associated with a large number of products. For illustrative convenience, this type of searching is referred to herein as "general" searching. However, it should be appreciated that other terms are commonly used to refer to this type of searching. Such terms include "informational" searching. When a user's intention is general searching, the user likely prefers a large number of search results that include information about a relatively broad range of products. For example, the user that submitted "toys" as a search query may not have a particular toy in mind. Instead, that user may be general searching with the intention of browsing across a large number of toys for the purpose of selecting a gift. However, if the search engine does not recognize that the user is general searching, the search results may be skewed toward a smaller selection of toys. Thus, the user may be dissatisfied with the limited scope of the search results and navigate away from the website.

In still other instances, users select and submit search queries with intentions that fall somewhere between specific and general searching. In these instances, for example, the user may have a general idea of the product of interest, but the user may not have a particular product in mind. For example, a user seeking information about lenses suitable for a Canon® camera may select and submit a search query the user believes fairly specifically describes what the user is searching for. The selected search query, for example, may be "Canon® lenses." Because the user only wants to research lenses suitable for a Canon® camera, the user's intention is not purely general searching for lenses. Further, because the user does not have a particular type and model of lens in mind, the user's intention is not purely specific searching. Accordingly, the user's intention falls somewhere between specific and general searching. In this case, the user likely prefers a reasonable number of search results that include information about a variety of camera lenses that are suitable for use with a Canon® camera. If the search service does not recognize the user's intention, it may deliver search results that are too broad or too specific. Other examples of search queries that fall somewhere between specific and general searching include "scissors," "water guns," "guitar picks," as well as artists or brands with small numbers of products.

Systems and methods described and suggested herein utilize various techniques to assess the degree of specificity of search queries. By assessing the degree of specificity of search queries, the systems and methods may be used to determine where the submitting users' intentions fall along the continuum between specific and general searching. Thus, the systems and methods may be used to deliver search results that more closely coincide with the users' intentions. For example, if clickstream data associated with a particular search query indicates that users typically submit the search query with the intention of specific searching, then embodiments may tailor search results to include a limited number of highly relevant search-result items. On the other hand, for example, if clickstream data associated with a particular search query indicates that users typically submit the search query with the intention of general searching, then embodiments may tailor search results to include a diverse set of search-result items from multiple categories. Further, for example, if clickstream data associated with a particular search query indicates that users typically submit the search query with intentions that fall somewhere between general and specific searching, then embodiments may tailor search results by highlighting highly relevant items as well as including a moderately diverse set of search-result items from different categories.

In operation, to assess the degree of specificity of a search query, embodiments of the present disclosure obtain clickstream data associated with the search query. According to some embodiments, the clickstream data is taken from across multiple users. The clickstream data associated with a search query may include, for example, an indication of the number of times users have submitted the search query and a list of search-result items that have been included in search results presented to users in response to the users' submission of the search query. For each of the search-result items, the clickstream data may include an indication of the number of times the search-result item has been included in search results presented to the users in response to the users' submission of the search query, the rank assigned to the search-result item, and an indication of the number of first-clicks the search-result item received, where the number of first-clicks represents the number of times users selected the search-result item first among all of the other search-result items presented to users in response to the users' submission of the search query. It should be appreciated that, in addition to clicking, users may select a search-result item by previewing, hovering, or otherwise interacting with the search-result item. It should be appreciated that instead of or in addition to including an indication of the number of first-clicks the search-result item received, the clickstream data may include an indication of the first two clicks received, all clicks received, the number of previews, shopping-cart adds, downloads, etc.

Using relevant clickstream data, embodiments calculate first-click entropy for the search query. According to some embodiments, first-click entropy represents first-click variation. For example, first-click entropy of a search query is relatively small if most of the users first-click the same search-result item, whereas first-click entropy of a search query is relatively large if each of the users first-clicks a different search-result item. According to an embodiment, first-click entropy is based at least in part on the set of first-click probability values of the search-result items presented to users in response to the users' submission of the search query. The first-click probability value of a search-result item represents the probability that the search-result item will be selected first among all search-result items. Although examples provided herein calculate and use first-click entropy to assess the degree of specificity of search queries, it should be appreciated that some embodiments could calculate and use click entropy for all clicks to assess the degree of specificity of search queries.

According to some embodiments, to calculate the first-click probability value of a search-result item, the number of first-clicks the search-result item received is divided by the first-clicks across all search results. It should be appreciated, however, that other embodiments divide the number of first-clicks the search-result item received by the number of times the search-result item was included in search results presented to users in response to the users' submission of the search query. Further, it should be appreciated that other embodiments calculate the first-click probability value for a search-result item by dividing the number of first-clicks the search-result item received by the number of times users have submitted the search query.

Embodiments convert the first-click entropy into a specificity score. According to some embodiments, first-click entropy of zero is mapped to a specificity score of one, and first-click entropy of infinity is mapped to a specificity score of zero. Accordingly, the closer the specificity score is to one, the more the first-clicks are skewed toward a single search-result item and the more likely the search query is submitted by users with the intention of specific searching. On the other hand, the closer the specificity value is to zero, the more the first-clicks are distributed across the search-result items and the more likely the search query is submitted by users with the intention of information searching. Although examples provided herein described calculating a specificity score based in part on data related to first-clicks, it should be appreciated that the specificity score could be calculated using data related to first two clicks, all clicks, previews, shopping-cart adds, downloads, etc.

Embodiments utilize the specificity score of the search query to tailor search results presented to users in response to the users' submission of the search query. The search results may be tailored so as to conform with the intention of the users that are submitting the search query. If the specificity score of the search query is close to one, embodiments may reference the first-click probability values of the search-result items to identify one or more (such as the top one or two) search-result items and only include those search-result items in the search results, thereby making it easy for users to navigate directly to the search-result item the users had in mind when they submitted the search query. If the specificity score of the search query is close to zero, embodiments may reference the first-click probability values to identify the most popular search-result items across a broad range of items and populate the search results with those items, thereby making it easy for users to view a broad range of search-result items. Embodiments may tailor the search results on a sliding scale commensurate with the specificity score.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
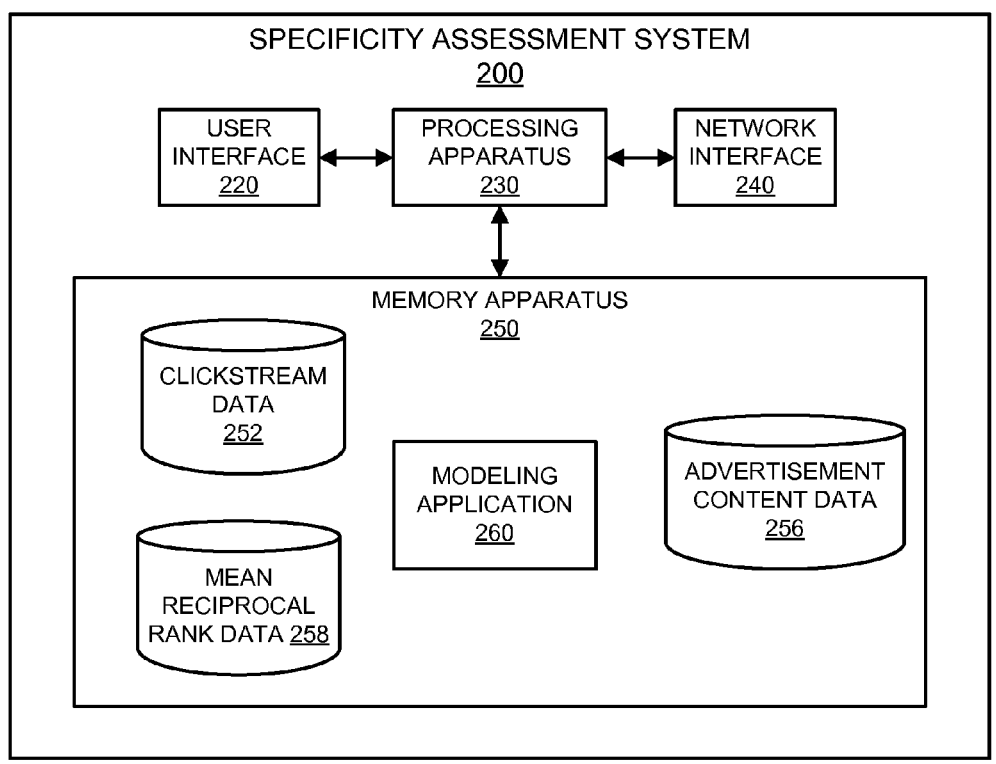
FIG. 2 is a block diagram depicting aspects of a system, in accordance with at least one embodiment.

It will be helpful to refer to an example system configured for assessing the degree of specificity of search queries. FIG. 2 provides a block diagram of one such specificity assessment system 200. The specificity assessment system 200 comprises a user-interface apparatus 220, a network-interface apparatus 240, and a memory apparatus 250 operatively coupled to a processing apparatus 230.

As described in greater detail below, embodiments of the specificity assessment system 200 are generally configured to assess the degree of specificity of search queries. To do so, embodiments of the specificity assessment system 200 (1) obtain clickstream data relevant to the search query in question; (2) determine the distribution of first-clicks across the search-result items provided in the search results; and (3) calculate a specificity score for the search query. The specificity score indicates where along the continuum between specific and general searching the intentions of the users who submit the search query fall. The specificity assessment system 200 may, in some embodiments, be integrated with other systems and environments, such as environment 100, and may share at least some hardware, software, and/or other resources with such other systems and environments.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the specificity assessment system 200 is entirely contained within a user terminal, such as a personal computer or mobile terminal, while, in other embodiments, the networking assessment system 200 includes a central computing system, one or more network servers, and one or more user terminals in communication with the central computing system via a network and the one or more network servers. FIG. 2 is intended to illustrate both types of configurations as well as other configurations that will be apparent to one of ordinary skill in the art in view of this disclosure.

The user interface 220, in an embodiment, includes hardware and/or software for receiving input into the specificity assessment system 200 from a user and hardware and/or software for communicating output from the specificity assessment system 200 to a user. In some embodiments, the user interface 220 includes one or more user input devices, such as a keyboard, keypad, mouse, microphone, touch screen, touch pad, controller, and/or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 104, including the data store 110. In some embodiments, the network interface 240 is further configured to send electronic output to other devices in a network.

The processing apparatus 230 includes circuitry used for implementing communication and logic functions of the specificity assessment system 200. For example, the processing apparatus 230 may include a digital signal processor device, a microprocessor device, and various analog-to-digital converters, digital-to-analog converters, and other support circuits. Control and signal processing functions of the specificity assessment system 200 are allocated between these devices according to their respective capabilities. The processing apparatus 230 may include functionality to operate one or more software programs based on computer-readable instructions thereof, which may be stored in the memory apparatus 250. As described in greater detail below, in one embodiment the memory apparatus 250 includes a modeling application 260 stored therein for instructing the processing apparatus 230 to perform one or more operations of the procedures described herein and in reference to FIGS. 3-5. Some embodiments may include other computer programs stored in the memory apparatus 250.

In general, the memory apparatus 250 is communicatively coupled to the processing apparatus 230 and includes at least one non-transitory computer-readable storage medium for storing computer-readable program code and instructions, as well as data stores containing data and/or databases. More particularly, the memory apparatus 250 may include volatile memory, such as volatile Random Access Memory (RAM) including a cache area for the temporary storage of data. The memory apparatus 250 may also include non-volatile memory that can be embedded and/or may be removable. The non-volatile memory can, for example, comprise an electrically erasable programmable read-only memory (EEPROM), flash memory, or the like. The memory apparatus 250 can store any of a number of pieces of information and data used by the specificity assessment system 200 to implement the functions of the specificity assessment system 200 described herein.

In the illustrated embodiment, the memory apparatus 250 includes data stores containing clickstream data 252, collection of content data 256, and advertisement content data 258. According to some embodiments, clickstream data 252 includes, for example, information about users' interactions with search-result items included in search results presented to the users in response to the users' submitting search queries. In some embodiments, the clickstream data 252 is taken from across multiple users. Further, in some embodiments, the clickstream data 252 is organized around search queries. For example, for each search query, the clickstream data 252 includes an indication of the number of times users have submitted the search query and corresponding search-result items that have been included in search results presented to users in response to the users' submission of the search query. For each of the search-result items, the clickstream data 252 may include an indication of the number of times the search-result item has been included in search results presented to users in response to the users' submission of the search query and an indication of the number of first-clicks the search-result item received, where the number of first-clicks represents the number of times users selected the search-result item first among all of the other search-result items presented to users in response to the users' submission of the search query. Further, for each of the search-result items, the clickstream data 252 may the rank assigned to the search-result item, e.g., where among the search results was the search-result item ranked.

Additionally, according to some embodiments, the clickstream data 252 includes—for each search query—a specificity score that represents the degree of specificity of the search query, a first-click entropy that indicates first-click variation, and a mean reciprocal rank. The specificity scores, the first-click entropy, and the mean reciprocal ranks for example, may be calculated according to processes 300, 400, and/or 500, and/or variations and/or combinations thereof, which are described below with reference to FIGS. 3-5. According to some embodiments, the specificity assessment system 200 calculates and stores in the clickstream data 252 the specificity scores, the first-click entropy, and/or the mean reciprocal ranks on a regular basis, such as once per day, once per week, etc. Further, according to some embodiments, the specificity assessment system 200 calculates and stores in the clickstream data 252 the specificity scores, the first-click entropy, and/or the mean reciprocal ranks each time users submit a search query to a search engine. Still further, according to some embodiments, the specificity assessment system 200 may regularly combine new clickstream data 252 with older clickstream data 252, where the older clickstream data 252 is appropriately decayed.

According to some embodiments, the collection of content data 256 may include any suitable content related to search-result items presented to users in response to users submitting search queries. Examples of suitable content include electronic records, data structures, data objects, representations including representations of search-result items, which may include goods such as physical goods and commercial goods and representations of services such as commercial services, documents, document collections, images including digital images in any suitable image format, audio, video, virtual environments including virtual realities (VR) and recordings thereof, and suitable combinations thereof. This content may be organized in any number of categories, such as book categories, electronics categories, apparel categories, etc.

According to some embodiments, advertisement content data 258 may include any suitable content related to search-result items. For example, the advertisement content data 258 may include sponsored links and sponsored ads related to items that are offered for sale by online retailers. The advertisement content data 258 may include content such as text, graphics, audio, and/or video that may be presented to users in response to users submitting particular search queries.

For the sake of clarity and ease of description, the figures provided herein generally illustrate the clickstream data 252, collection of content data 256, and advertisement content data 258 as each being separate from one another. However, it will be understood that, in some embodiments, these data stores may be combined or the data described as being stored within such data stores may be further separated into additional data stores.

As further illustrated by FIG. 2 and as briefly mentioned above, the memory apparatus 250 also includes the modeling application 260. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the modeling application 260 includes computer-readable instructions for instructing the processing apparatus 230 and/or other devices to perform one or more of the functions described herein, such as one or more of the functions described in FIGS. 3-5.

Figure 3:
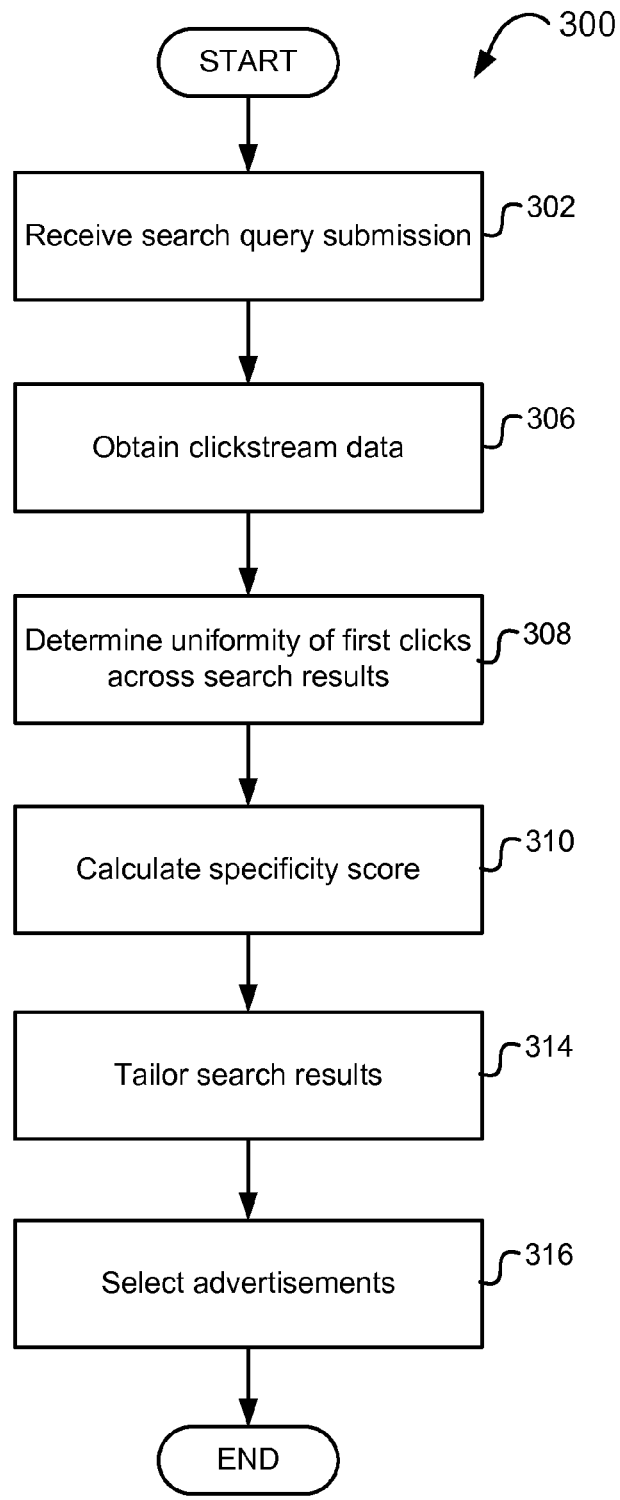
FIG. 3 provides a flow diagram illustrating a process whereby the system of FIG. 2 is used to assess the degree of specificity of search queries and tailor search results accordingly, in accordance with at least one embodiment.

FIG. 3 provides a flow diagram illustrating a process 300 whereby the system of FIG. 2 is used to assess the degree of specificity of search queries and tailor search results accordingly, in accordance with at least one embodiment. Portions of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. As indicated at block 302, the process 300 generally begins with receiving a search query submission from a user. For example, the specificity assessment system 200 could be hosted by or on behalf of an online retailer and used to assess the specificity of search queries submitted by users, such as customers of the online retailer. Further, for example, the specificity assessment system 200 could receive the search query via the network interface 240 from another component of the environment 100. Also, for example, the specificity assessment system 200 could receive the search query directly from the submitting user via the user interface 220. As indicated at block 306, the process 300 involves obtaining clickstream data associated with the search query. For example, after receiving the search query, the modeling application 260 may instruct the processing apparatus 230 to access the clickstream data 252 and obtain clickstream data associated with the search query.

Figure 4:
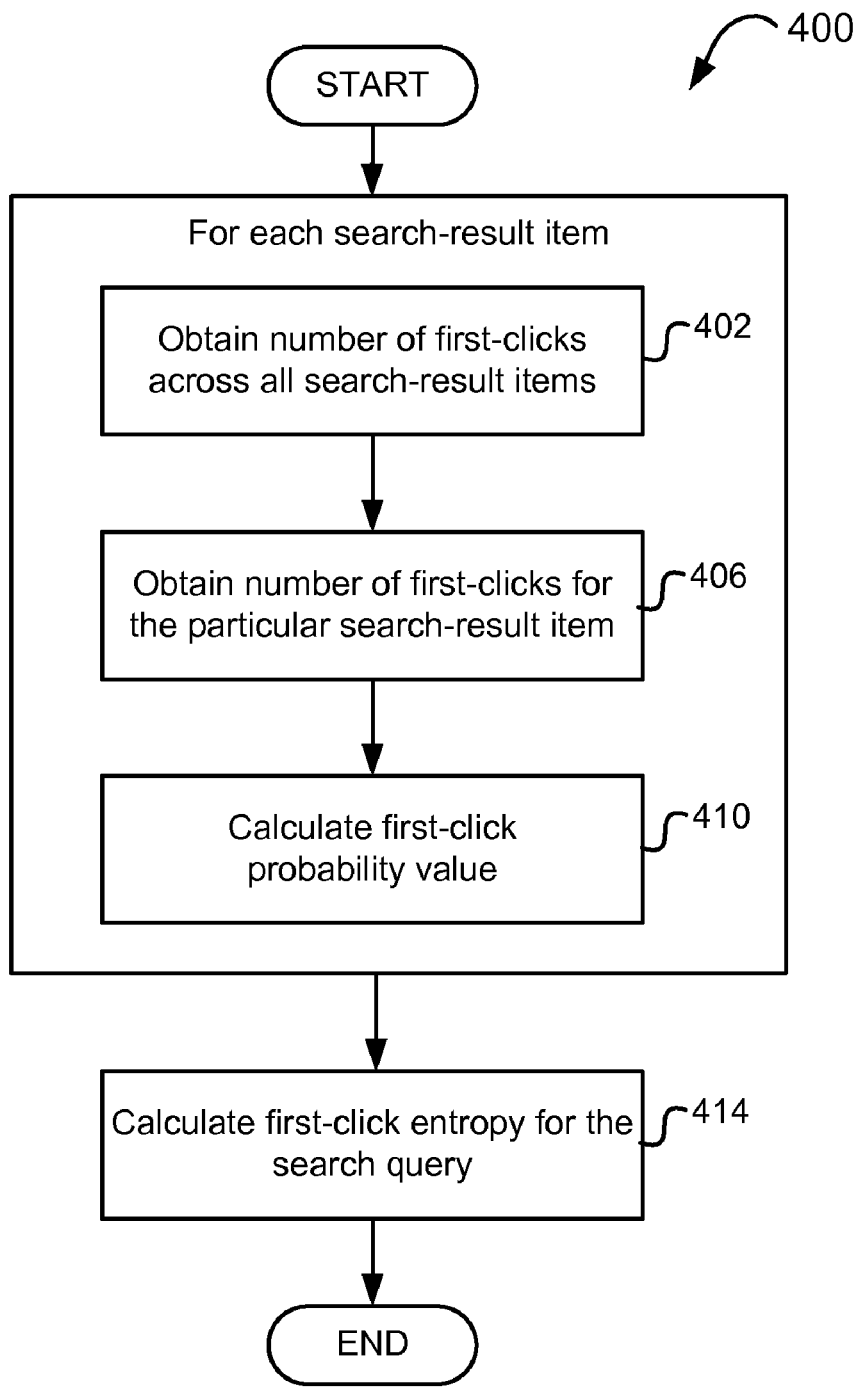
FIG. 4 provides a flow diagram illustrating a process whereby the system of FIG. 2 is used to determine a distribution of first-clicks across search results, in accordance with at least one embodiment.

As mentioned above, the clickstream data associated with the search query may include an indication of the number of times other users have submitted the search query and the corresponding search-result items that were included in search results presented to those users. Further, for each of the search-result items, the clickstream data 252 may include an indication of the number of times the search-result item was included in search results presented to those users and an indication of the number of first-clicks the search-result item received. As indicated at block 308, after obtaining clickstream data, the process 300 involves determining the uniformity of the distribution of first-clicks across the search results provided to users in response to the users submitting the search query. FIG. 4 provides a flow diagram illustrating a process 400 whereby the system of FIG. 2 is used to determine the uniformity of the distribution of first-clicks across the search results.

As indicated at block 402, the process 400 generally begins with obtaining a total number of first-clicks across all search-result items. For example, according to block 402, the modeling application 260 may instruct the processing apparatus 230 to obtain an indication of the total number of times users first-clicked any search-result item that was presented to users in response to users submitting the search query. As indicated at block 406, the process 400 further involves obtaining the number of first-clicks for each search-result item that was presented to users in response to the users submitting the search query. For example, according to block 406, the modeling application 260 may instruct the processing apparatus 230 to identify each of the search-result items presented to users who submitted the search query and, for each of the search-result items, identify the number of times the search-result item was first-clicked.

As indicated at block 410, the process 400 involves calculating a first-click probability value for each of the search-result items presented to users in response to the users submitting the search query. According to some embodiments, the first-click probability of a search-result item represents the probability that users will first-click the search-result item if the search-result item is presented to users in response to the users submitting a particular search query. According to an embodiment, the first-click probability value of a search-result item is calculated by dividing the number of first-clicks the search-result item received by the total number of first-clicks received across all search-result items. For example, to calculate the first-click probability value for a search-result item, the modeling application 260 may instruct the processing apparatus 230 to divide the number of first-clicks the search-result item received by the total number of times users submitted the relevant search query and first-clicked one of the search-result items.

Equation 1, which is provided below, defines first-click probability according to an embodiment.

$$P(p \mid q) = \frac{|\text{Clicks}(q, p)|}{|\text{Clicks}(q)|} \quad \text{(Equation 1)}$$

According to Equation 1, Clicks(q, p) is the number of times users first-clicked on search-result item p in response to submitting search query q, whereas Clicks(q) is the number of times users first-clicked on any search-result item in response to submitting search query q. Thus, P(P|q) is the first-click probability of the search-result item p, e.g., the percentage of the first-clicks on search-result item p among all first-clicks for search query q. To execute the step represented by block 410, the modeling application 260 may instruct the processing apparatus 230 to apply Equation 1 to determine the first-click probability values for the search-result items.

As indicated at block 414, the process 400 involves calculating first-click entropy for the search query. According to an embodiment, first-click entropy represents the uniformity of the distribution of first-clicks across the search-result items. Distributions with higher first-click entropies are more uniform (e.g., users evenly first-clicked across a larger number of different search-result items), whereas those with lower first-click entropies are more clustered (e.g., users first-clicks are concentrated on a smaller number of the same search-result items).

According to an embodiment, first-click entropy may be calculated according to Equation 2, which is provided below.

$$\text{Entropy}(q) = \sum_{p \in P(q)} -P(p \mid q)\log_2 P(p \mid q) \quad \text{(Equation 2)}$$

According to Equation 2, Entropy(q) is the first-click entropy of search query q. P(q) is the collection of search-result items presented in response to users submitting search query q. P(p|q) is the first-click probability value of search-result item p, as calculated according to Equation 1. In operation, according to block 414, the modeling application 260 may instruct the processing apparatus 230 to apply Equation 2 to determine the first-click entropy, e.g., the uniformity of first-clicks across the search results.

Referring again to FIG. 3, after determining the uniformity of first-clicks across search-result items, embodiments calculate a specificity score, as indicated at block 310. According to some embodiments, the process 300 involves mapping a first-click entropy of zero to a specificity score of one, and mapping a first-click entropy of infinity to a specificity score of zero. Thus, according to some embodiments, specificity scores range from zero to one, where one represents a degenerate distribution with all probability mass on a single result and where zero represents a uniform distribution across all search results. Accordingly, the closer the specificity score is to one, the more the first-clicks are skewed toward a single search-result item and the more likely the search query is submitted by users with the intention of specific searching. On the other hand, the closer the specificity value is to zero, the more the first-clicks are distributed across the search-result items and the more likely the search query is submitted by users with the intention of information searching.

According to some embodiments, to execute the step represented at block 310, the modeling application 260 instructs the processing apparatus 230 to apply the first-click entropy in a logistic function to calculate a specificity score that ranges from zero to one. The logistic function may be configured to decrease the specificity score as the first-click entropy increases. Thus, as the first-clicks are more evenly distributed across the search-result items, the specificity score decreases, thereby indicating that the degree of specificity of the search query is decreasing. This indicates the intention of the user is general searching. Similarly, the logistic function could be configured to increase the specificity score as the first-click entropy decreases. Thus, as the first-clicks skew toward a smaller number search-result items, the specificity score increases, thereby indicating that the degree of specificity of the search query is increasing. This indicates the intention of the user is likely approaching specific searching.

For example, the modeling application 260 may instruct the processing apparatus 230 to apply the first-click entropy in a logistic function such as Equation 3, which is provided below.

$$\text{SpecifictyScore} = \frac{1}{(1 + e^{(-(B + M*(entropy)))})} \quad \text{(Equation 3)}$$

According to Equation 2, entropy is first-click entropy and parameters B and M may be adjusted to tune the rate at which the specificity score decreases as first-click entropy increases. In operation, according to block 310, the modeling application 260 may instruct the processing apparatus 230 to apply Equation 3 to determine the specificity score.

As indicated at block 314, the process 300 involves tailoring search results. For example, according to block 314, the specificity score of the search query could be used to tailor the search results such that the search results are consistent with the intentions of the submitting users. For example, according some embodiments, the modeling application 260 may instruct the processing apparatus 230 to access the collection of content data 256 and identify search-result items that are consistent with the search query in light of the specificity score. This content could then be included in search results presented to users.

For example, if the specificity score of the search query is close to one, the modeling application 260 may instruct the processing apparatus 230 to access the collection of content data 256 and identify search-result items that have high first-click probability values, which, as discussed in detail above, indicate users likely select these search-result items. The processing apparatus 230 may select one or two search-result items having the highest first-click probability values. The search results may then be tailored to only include the one or two search-result items, thereby making it easy for users to navigate directly to the search-result item the users had in mind when submitting the search query.

On the other hand, if the specificity score of the search query is close to zero, the modeling application 260 may instruct the processing apparatus 230 to access the collection of content data 256 and reference search-result items and their corresponding the first-click probability values to identify the most popular search-result items across a number of categories, e.g., books, movies, apparel, etc. The search results may be tailored to include search-result items from each of the categories, thereby making it easy for users to view a broad range of search-result items. Embodiments may tailor the search results on a sliding scale commensurate with the specificity score. For example, the closer the specificity score is to one, the more the search results are focused on a smaller number of search-result items having high first-click probability values, whereas the closer the specificity score is to zero, the more the search results are spread out across multiple categories. For example, if specificity score of a particular search query indicates that users typically submit the search query with intentions that fall somewhere between general and specific searching, then embodiments may tailor search results by highlighting highly relevant items as well as including a moderately diverse set of search-result items from different categories.

As indicated at block 316, the process 300 involves selecting one or more advertisements. For example, according to block 316, the specificity score of the search query could be used to select advertisements such that the advertisements are consistent with the intentions of the submitting users. For example, according some embodiments, the modeling application 260 may instruct the processing apparatus 230 to access the advertisement content 258 and identify advertisement content consistent with the search query in light of the specificity score. This content could then be presented to users along with the search results presented to users.

As an example, if the specificity score of the search query is close to one, the modeling application 260 may instruct the processing apparatus 230 to access the collection of content data 256 and identify search-result items that have high first-click probability values. Then, the modeling application 260 may instruct the processing apparatus 230 to access the advertisement content to identify advertisement content, such as sponsored links or ads, directed to the identified search-result items. The conversion rate of these items may be favorable considering that the users are likely specific searching for particular product and that the advertisement content may directed to the particular product or similar products. Further, for example, if the specificity score indicates the user is information seeking, then the user could be presented with advertisement content, such as an invitation to a storefront that provides products in the range of categories in which the user is searching.

Figure 5:
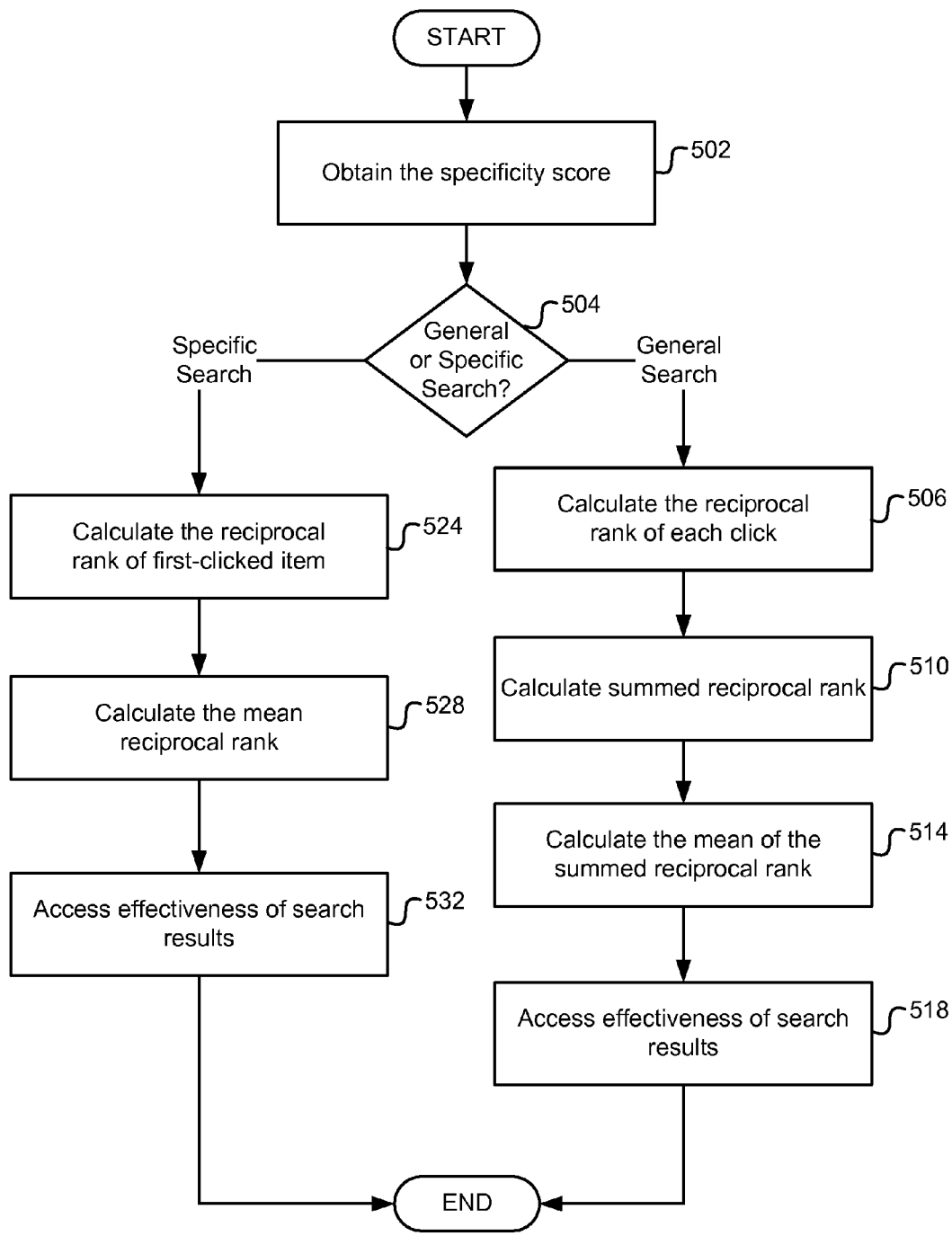
FIG. 5 provides a flow diagram illustrating a process whereby the system of FIG. 2 is used to assess the effectiveness of search results, in accordance with at least one embodiment.

FIG. 5 provides a flow diagram illustrating a process 500 whereby the system of FIG. 2 is used to assess the effectiveness of search results presented in response to the submission of a search query, in accordance with at least one embodiment. As indicated at block 502, the process 500 generally begins with obtaining the specificity score of the search query in question and, as indicated at decision block 504, determining whether the search query is associated with a general search or specific search. For example, if the specificity score is above a threshold, e.g., 0.75, then the users' intentions are specific searching, whereas, if the specificity score is below the threshold, then the users' intentions are general searching.

If the search query is determined to be associated with a general search, the process 500 involves calculating the reciprocal rank of each search-result item that a user clicks on after submitting a search query, as indicated at block 506. For example, after a user submits the search query and clicks on a search-result item, the step indicated at block 506 involves determining the rank of the selected search-result item and then calculating the reciprocal of the determined rank. If, after submitting the search query, the user clicks on the fifth search-result item listed in the search results, then the rank of the search-result item is 5 and the reciprocal rank of the search-result item is 1/5. According to an embodiment, the reciprocal rank is calculated for each search-result item the user clicked after submitting the search query. Thus, for example, if the user clicked on two different search-result items, then reciprocal rank is calculated for each of the two search-result items. As indicated at block 510, the process 500 further involves calculating the summed reciprocal rank.

Referring to the previous example, if the two search-result items that the user clicked on were the second and fourth ranked search-result items, then the reciprocal rank of each item is 1/2 and 1/4, respectively, and the summed reciprocal rank is 3/4.

As indicated at block 514, the process 500 further involves calculating the mean of the summed reciprocal rank across all users that submitted the search query. According to an embodiment, the mean of the summed reciprocal rank is calculated by aggregating the summed reciprocal rank that was calculated each time users submitted the search query and then dividing by the number of times users submitted the search query. As indicated at block 518, the process 500 involves using the mean of the summed reciprocal rank to assess the effectiveness of the search query. In the context of a general search, a larger mean of the summed reciprocal rank (e.g., 1/1 or 1/2) indicates that the search results were not effective because users likely abandoned the search after clicking on the first one or two search-result items. On the other hand, a smaller mean of the summed reciprocal rank (e.g., 1/12 or 1/20) indicates the search results were likely effective because users likely clicked on multiple search results having varying rankings.

Referring again to decision block 504, if it is determined that the search query is associated with a specific search, the process 500 involves calculating the reciprocal rank of the search query for each instance users have submitted the search query, as indicated at block 524. According to an embodiment, the reciprocal ranks are calculated based on the search-result item that the user first-clicked. For example, calculating the reciprocal rank for a single instance in which a user submitted the search query involves determining the rank of the search-result item that the user first-clicked and then calculating the reciprocal of the rank. For example, if the user first-clicked the second ranked search-result item, the reciprocal rank would be 1/2. Similarly, if the user first-clicked the fifth ranked search-result item, the reciprocal rank would be 1/5. As mentioned above, the step indicated at block 524 involves determining the reciprocal rank for each instance users have submitted the search query. As indicated at block 528, the process 500 further involves determining the mean reciprocal rank across all instances when users submitted the search query. According to an embodiment, to calculate the mean reciprocal rank for a search query, the process 500 involves summing the reciprocal rank of each instance when the search query was submitted and then dividing by the number of instances the search query was submitted.

As indicated at block 532, the process 500 further involves using the mean reciprocal rank to assess the effectiveness of the search results provided in response to the submission of the search query. According to an embodiment, because the search query is intended for specific searching, the larger the mean reciprocal rank, the more favorable the assessment of the search results. For example, if the mean reciprocal rank is close to 1/1 or 1/2, then the search-result item that the user was searching for was ranked first or second in the list of search results. Thus, the search results were effective. However, for example, if the mean reciprocal rank is smaller, then the user likely had to browse through the search-result items before clicking on a search-result item. Thus, the search results were not as effective.

Although embodiments described herein involve determining the reciprocal rank of search-result items to assess the effectiveness of search results, it should be appreciated that the reciprocal rank of advertisements may be determined to assess the effectiveness of the advertisements presented in response to the user-submission of a search query.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of assessing specificity of a search query, the method comprising:
    under the control of one or more computer systems configured with executable instructions,
    obtaining clickstream data associated with the search query, the clickstream data comprising:
    indications of items listed in search results presented to users in response to the users submitting the search query in a search engine;
    for each of the items, an indication of a number of times the item was listed in the search results and an indication of a number of first-clicks the item received, wherein a first-click occurs when a user clicks, previews, hovers, or otherwise interacts with an item first in time before the other items listed in the search results;
    for each of the items, determining a first-click probability value by dividing the number of times the users first-clicked the item by a total number of first-clicks received across all of the items listed in the search results; and
    determining a specificity score for the search query based at least in part on the first-click probability values of the items listed in the search results, wherein the specificity score for the search query indicates a uniformity of a distribution of first-clicks across the items presented in the search results, and wherein the distribution is indicative of how the first-clicks are spread across the items presented in the search results, wherein the more evenly distributed the distribution of first-clicks, the lower the specificity score and the more likely the search query is submitted by users with the intention of general searching, and wherein the more skewed the distribution of first-clicks, the higher the specificity score and the more likely the search query is submitted by users with the intention of specific searching.

2. The computer-implemented method of claim 1, further comprising:
    determining a first-click entropy for the search query based at least in part on the first-click probability values of the items listed in the search results presented to the users in response to the users submitting the search query, wherein the specificity score is based at least in part on the first-click entropy.

3. The computer-implemented method of claim 1, wherein the more evenly the first-click probability values are distributed across the items listed in the search results, the lower the specificity score and the more likely the search query is submitted by users with the intention of general searching.

4. The computer-implemented method of claim 1, wherein the more skewed the first-click probability values are toward one of the items listed in the search results, the higher the specificity score and the more likely the search query is submitted by users with the intention of specific searching.

5. The computer-implemented method of claim 1, further comprising:
    comparing the specificity score to a threshold specificity score;
    determining that users likely submit the search query with the intention of specific searching if the specificity score is equal to or greater than the threshold specificity score; and
    determining that users likely submit the search query with the intention of general searching if the specificity score is less than the threshold specificity score.

6. A computer-implemented method of assessing specificity of a search query, the method comprising:
    under the control of one or more computer systems configured with executable instructions,
    obtaining data associated with the search query, the data comprising indications of search-result items and, for each search-result item, a corresponding number of first-clicks, the search-result items being items presented to users in response to the users submitting the search query, the number of first-clicks indicating the number of times the users selected the corresponding search-result item first in time before other items;
    using the indications of the search-result items and the corresponding number of first-clicks to create a distribution of first-clicks across the search result items, wherein the distribution is indicative of how the first-clicks are spread across the search-result items; and
    determining a specificity score for the search query based at least in part on the distribution of first-clicks across the search result items, wherein the more evenly distributed the distribution of first-clicks, the lower the specificity score and the more likely the search query is submitted by users with the intention of general searching, and wherein the more skewed the distribution of first-clicks, the higher the specificity score and the more likely the search query is submitted by users with the intention of specific searching.

7. The computer-implemented method of claim 6, wherein using the indications of the search-result items and the corresponding number of first-clicks to create the distribution of first-clicks across the search result items, comprises:
    determining a first-click probability value for each of the search-result items by dividing the number of first-clicks for the search-result item by a total number of first-clicks received across all of the search-result items.

8. The computer-implemented method of claim 7, further comprising:
    comparing the specificity score to a threshold specificity score;
    determining that users likely submit the search query with the intention of specific searching if the specificity score is equal to or greater than the threshold specificity score; and determining that users likely submit the search query with the intention of general searching if the specificity score is less than the threshold specificity score.

9. The computer-implemented method of claim 8, further comprising:
if the specificity score is equal to or above the threshold and users likely submit the search query with the intention of specific searching, highlighting the search-result item that has the highest first-click probability value so that the users can easily identify the item when reviewing the search-result items.

10. The computer-implemented method of claim 8, further comprising:
if the specificity score is equal to or above the threshold and users likely submit the search query with the intention of specific searching, presenting one or more sponsored links related to the search-result item that has the highest first-click probability value.

11. The computer-implemented method of claim 8, further comprising:
if the specificity score is equal to or above the threshold and users likely submit the search query with the intention of specific searching, directing users to a webpage associated with the search-result item that has the highest first-click probability value.

12. The computer-implemented method of claim 8, further comprising:
if the specificity score is below the threshold and users likely submit the search query with the intention of general searching, presenting the users with search-result items from a plurality of categories that may be relevant to the search query.

13. The computer-implemented method of claim 12, wherein a category label is associated with each the search-result items.

14. The computer-implemented method of claim 8, further comprising:
if the specificity score is below the threshold and users likely submit the search query with the intention of general searching, presenting the users with tools to help narrow down the search-result items.

15. A computer-implemented method, comprising:
under the control of one or more computer systems configured with executable instructions,
obtaining data associated with a search query, the data comprising:
an indication of the number of times the users submitted the search query; and
indications of search-result items and corresponding number of first-clicks, the search-result items being items presented to the users in response to the users submitting the search query, the number of first-clicks being the number of times the users selected the corresponding search-result item first in time before other items; and
determining a first-click probability value for each of the search-result items based at least in part on a relationship between the number of first-clicks for the search-result item and a total number of first-clicks received across all of the search-result items;
using the first-click probability values of the search-result items to create a distribution of first-clicks across the search result items, wherein the distribution is indicative of how the first-clicks are spread across the search-result items;
determining a specificity score for the search query based at least in part on the distribution of first-clicks across the search result items;

responsive to the users submitting the search query, tailoring search results presented to the users based at least in part on the specificity score, wherein the more evenly distributed the distribution of first-clicks, the lower the specificity score and the more likely the search query is submitted by users with the intention of general searching, and wherein the more skewed the distribution of first-clicks, the higher the specificity score and the more likely the search query is submitted by users with the intention of specific searching.

16. The computer-implemented method of claim 15, wherein tailoring search results comprises:
if the specificity score is equal to or above a threshold, highlighting the search-result item that has the highest first-click probability value so that the users can easily identify the item when reviewing the search-result items.

17. The computer-implemented method of claim 15, wherein tailoring search results comprises:
if the specificity score is above a threshold, presenting one or more sponsored links related to the search-result item that has the highest first-click probability value.

18. The computer-implemented method of claim 15, wherein tailoring search results comprises:
if the specificity score is above a threshold, directing users to a webpage associated with the search-result item that has the highest first-click probability value.

19. The computer-implemented method of claim 15, wherein tailoring search results comprises:
if the specificity score is below a threshold, presenting the users with search-result items from a plurality of categories that may be relevant to the search query.

20. A computer program product embedded in a computer-readable storage medium, comprising:
program code for obtaining data associated with a search query, the data
comprising indications of search-result items and corresponding number of first-clicks, the search-result items being items presented to users in response to the users submitting the search query, the number of first-clicks being the number of times the users selected the corresponding search-result item first in time before other items;
program code for using the indications of the search-result items and the corresponding number of first-clicks to create a distribution of first-clicks across the search result items, wherein the distribution is indicative of how the first-clicks are spread across the search result items; and
program code for determining a specificity score for the search query based at least in part on the distribution of first-clicks across the search result items, wherein the more evenly distributed the distribution of first-clicks, the lower the specificity score and the more likely the search query is submitted by users with the intention of general searching, and wherein the more skewed the distribution of first-clicks, the higher the specificity score and the more likely the search query is submitted by users with the intention of specific searching.

21. The computer program product of claim 20, wherein using the indications of the search-result items and the corresponding number of first-clicks to create the distribution of first-clicks across the search result items, comprises:
determining a first-click probability value for each of the search-result items by dividing the number of first-clicks for the search-result item by a total number of first-clicks received across all of the search-result items.

22. A system, comprising:
one or more processors; and
one or more memory device that collectively include instructions that, when executed by the processor, cause the processor to:
obtain data associated with a search query, the data comprising indications of search-result items and corresponding number of first-clicks, the search-result items being items presented to users in response to the users submitting the search query, the number of first-clicks being the number of times the users selected the corresponding search-result item first in time before other items;
use the indications of the search-result items and the corresponding number of first-clicks to create a distribution of first-clicks across the search result items, wherein the distribution is indicative of how the first-clicks are spread across the search-result items;
determine a specificity score for the search query based at least in part on the distribution of first-clicks across the search result items, wherein the more evenly distributed the distribution of first-clicks, the lower the specificity score and the more likely the search query is submitted by users with the intention of general searching, and wherein the more skewed the distribution of first-clicks, the higher the specificity score and the more likely the search query is submitted by users with the intention of specific searching;
use the specificity score to select search results; and
provide the content to the user.

23. The system of claim 22, the instructions that, when executed by the processor, further cause the processor to:
determine a first-click probability value for each of the search-result items by dividing the number of first-clicks for the search-result item by a total number of first-clicks received across all of the search-result items.

* * * * *